US005694593A

United States Patent [19]
Baclawski

[11] Patent Number: 5,694,593
[45] Date of Patent: Dec. 2, 1997

[54] DISTRIBUTED COMPUTER DATABASE SYSTEM AND METHOD

[75] Inventor: Kenneth P. Baclawski, Waltham, Mass.

[73] Assignee: Northeastern University, Boston, Mass.

[21] Appl. No.: 318,252

[22] Filed: Oct. 5, 1994

[51] Int. Cl.[6] .................................................. G06F 17/30
[52] U.S. Cl. ..................... 395/605; 395/603; 395/602; 395/621; 395/672
[58] Field of Search ....................... 395/600, 602, 395/603, 605, 621, 672; 364/419.19, 200

[56] References Cited

U.S. PATENT DOCUMENTS

| | | | |
|---|---|---|---|
| 4,811,199 | 3/1989 | Kuechler et al. | 364/200 |
| 5,006,978 | 4/1991 | Neches | 364/208 |
| 5,265,207 | 11/1993 | Zak et al. | 395/200 |
| 5,309,359 | 5/1994 | Katz et al. | 364/419.19 |

OTHER PUBLICATIONS

Chaturvedi, et al., "Scheduling the Allocation of Data Fragments in a Distributed Database Environment: A Machine Learning Approach", IEEE Transactions On Engineering Management, vol. 41, No. 2, May 1994.

Houtsma et al., "Parallel Hierarchical Evaluation of Transitive Closure Queries", IEEE Apr. 1991.

Baclawski, K., "High–Performance, Indexing and Retrieval for Object–Oriented Databases", College of Computer Science, Northeastern University, Apr. 1994.

Baclawski et al., "High–Performance, Distributed Information Retrieval", College of Computer Science, Tecnical Report NU–CCS–94–05, Northeastern University, Feb. 25, 1994.

Salton, G., "Automatic Text Processing: The Transformation, Analysis, and Retrieval of Information by Computer", Cornell University, Chapter 10, Dec. 1988.

Salton et al., "Automatic Structuring and Retrieval of Large Text Files", Communications of the ACM, vol. 37, No.2, Feb. 1994.

Baclawski et al., "A distibuted approach to high–performance information retrieval", Northeastern University, Mar., 1994.

Baclawski et al., "A unified approach to high–performance, vector–based information retrieval", Northeastern University, Mar. 21, 1994.

Baclawski et al., "KEYNET: An architecture and protocol for high–performance semantically rich information retrieval", Northeastern University, Apr. 29, 1994.

Baclawski et al., "An abstract for sematically rich information retrieval", Northeastern University, Mar. 31, 1994.

Baclawski et al., "KEYNET: Fast Indexing for semantically rich information retrieval", Northeastern University, Technical Report NU–CCS–94–06, Dec. 7, 1993.

Primary Examiner—Thomas G. Black
Assistant Examiner—Cheryl R. Lewis
Attorney, Agent, or Firm—Weingarten, Schurgin, Gagnebin & Hayes LLP

[57] ABSTRACT

A distributed computer database system including a front end computer and a plurality of computer nodes interconnected by a network into a search engine. A query from a user is transmitted to the front end computer which forwards the query to one of the computer nodes, termed the home node, of the search engine. The home node fragments the query and hashes the fragments of query to create an index by which the hashed query fragments are transmitted to one or more nodes on the network. Each node on the network which receives a hashed fragment uses the fragment of the query to perform a search on its respective database. The results of the searches of the local databases are then gathered by the home node.

17 Claims, 13 Drawing Sheets

DISTRIBUTED COMPUTER DATABASE SYSTEM AND METHOD

FIELD OF THE INVENTION

The invention relates to computer database systems and more specifically to distributed computer database systems.

BACKGROUND OF THE INVENTION

An object database consists of a collection of data or information objects. Each information object is identified uniquely by an object identifier (OID) and is described by a content label. The content label is written in a formal artificial language specified by the ontology of the database. The ontology specifies the data types, the access points or attributes of the data, the access or attribute values of the data, the join conditions or linking relationships between the data, and the grammar rules or constraints that must be satisfied by all content labels.

An ontology can also specify weight information such as the strength of a relationship or the degree of prototypicality of an attribute value. Weight information can also be included in content labels to distinguish more important parts of a content label from less important parts.

Queries to extract data from the database are written in the same formal language as the one used for content labels and hence must conform to the same ontology. A fragment of a content label or a query is a part of the content label or query consisting of a limited number of attributes and attribute values joined by relationships. An index term is a fragment of a content label, while a probe is a fragment of a query.

It should also be noted that the information object itself need not be stored in the database system as long as pointers to the data are available. Databases include indexes by which the database locates stored data. Large databases require correspondingly large indexes to maintain pointers to the stored data. Such an index can be larger than the database itself. Such large indexes are stored in relatively slow secondary storage rather than faster main memory because the main memory controlled by a single computer processor is limited in size.

Furthermore, each index term can be used to search for only one attribute of the data. Therefore, queries involving several attributes of the data are restricted to using only one index term corresponding to one attribute to locate the data. The remaining attributes of the data requested by the query are sequentially searched for, even if other indexes are available for the remaining attributes of the query. Additionally, a query that links or joins several attributes is performed using a sequential scan.

Finally, there is considerable overhead associated with maintaining an index. This limits the number of attributes that can be indexed. Current systems are unable to scale up to support databases for which there are: hundreds of data types; thousands of attributes; thousands of join conditions; queries that involve many data types, attributes and join conditions simultaneously; tens of millions of information objects; tens of millions of queries per day; rapid response-time-to-query requirements; and new data types, attributes and join conditions continually being added.

The present invention avoids these limitations.

SUMMARY OF THE INVENTION

The invention relates to a distributed computer database system which includes a front end computer and a plurality of computer nodes interconnected by a network. The combination of computer nodes interconnected by the network operates as a search engine.

A user wishing to query the database, transmits the query to the front end computer which in turn forwards the query to one of the computer nodes of the network. The node receiving the query, termed the home node of the search engine, fragments the received query and then hashes the fragments of the query. A portion of the hashed fragment is used by the home node as an addressing index by which the home node transmits the hashed query fragment to a node on the network.

Each node on the network which receives a hashed query fragment uses the fragment of the query to perform a search on its respective database. Nodes finding data corresponding to the query fragment return an identifier permitting the user to access the data in the database. Such identifiers are then gathered by the home node.

DESCRIPTION OF THE DRAWINGS

This invention is pointed out with particularity in the appended claims. The above and further advantages of this invention may be better understood by referring to the following description taken in conjunction with the accompanying drawing, in which:

DETAILED DESCRIPTION OF THE INVENTION

Figure 1:
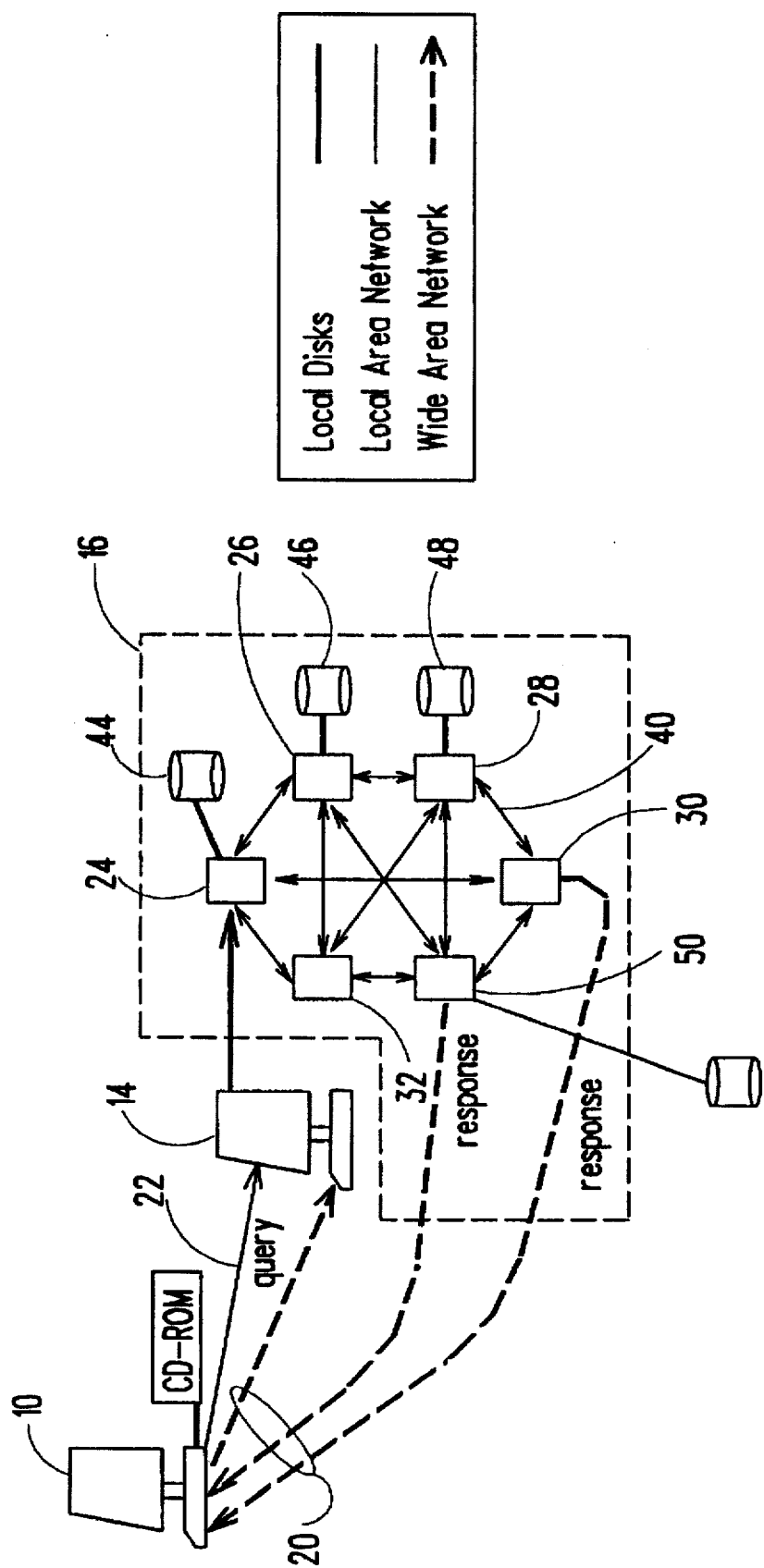
FIG. 1 is a block diagram of an overview of an embodiment of the distributed computer database system of the invention.

Referring to FIG. 1, in broad overview, one embodiment of a distributed computer database system of the invention includes a user computer 10 which is in communication with a front end computer 14 through a wide area network 20 or a local network 22. The front end computer 14, which may also be the user computer 10, is in turn in communication with a search engine 16 which includes one or more computer nodes 24, 26, 28, 30, 32, 50 interconnected by a local area network 40. The individual computer nodes 24, 26, 28, may include local disks 44, 46, 48 or may, alternatively or additionally, obtain data from a network disk server 50.

In one embodiment each computer node 24, 26, 28, 30, 32 is a Sparcstation 10/30 with 32 MBytes of random access memory (RAM). The computer nodes are interconnected by a twisted pair network having a maximum data transfer rate of 100 Mbits/sec. In an alternative embodiment, all the computer nodes 24, 26, 28, 30, 32 are associated with local disks.

Figure 2:
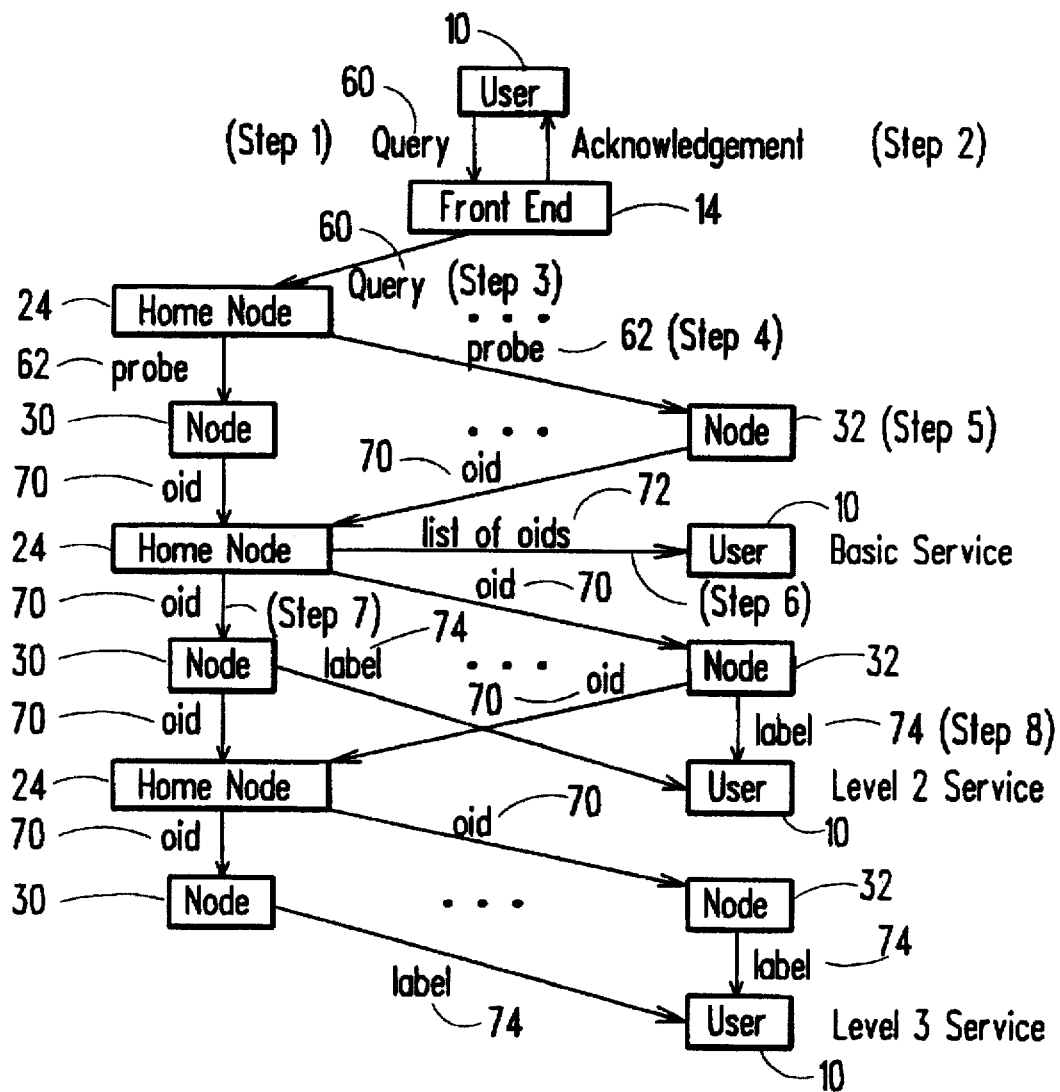
FIG. 2 is an overview of the steps used by the embodiment of the distributed computer database system of claim 1 to respond to a query.

Considering the processing of a query first, and referring also to FIG. 2, in one embodiment when a user transmits (Step 1) a query 60 from the user computer 10, the front end computer 14 receives the query 60 and immediately issues an acknowledgement (Step 2). The front end computer 14 then transmits (Step 3) the query 60 to one of the computer nodes 24, which is then defined as the home node 24 of the search engine 16 for that query 60.

The home node 24 divides the query 60 into a number of (possibly overlapping) fragments or probes 62 which it then hashes using a predefined hashing function. Data in the system was previously stored locally on the various nodes using this hashing function to generate an index to the data in the local database. Thus, the use of the same hashing function to generate an index for data storage and to generate a hashed probe for data query assures that 1.) data is distributed uniformly over the nodes of the search engine during the storing of data and 2.) the probes are scattered uniformly over the nodes during the processing of a query.

In one embodiment, the hash value resulting from the use of the hashing function has a first portion which serves to identify the node to which the data is to be sent to be stored or to which query fragment is to be sent as a probe and a second portion which is the local index by which the data is stored at that node. In one embodiment, the hashing function reduces a query fragment to a 37 bit value, in which the first 5 bits designate the node to which the data or query is sent and the low order 32 bits which provides the index into the local hash table of the node's database. Thus, in terms of a query, the hashed query fragments are distributed (Step 4) as probes 62 to certain computer nodes 26, 28, 30, 32, of the search engine 16, as determined by the first portion of the hash value.

At a first or basic service level, computer nodes 30, 32 whose probes 62 match the index terms or labels by which the data was initially stored on that node respond to the query 60 by transmitting (Step 5) the object identifiers (OIDs) 70 matching the index terms of the requested information to the home node 24. Thus, all matches between the hashed probes and the local hash table of index terms are returned or gathered to the home node which initially hashed the query.

Since the use of a hashing function results in non-relevant material also being accessed, the relevance of each object returned in the search must be determined. This determination of relevance is made by the home node 24 by comparing the degree of similarity between the query 60 and the information or object label 74 returned. In one embodiment the measure of similarity between the query 60 and the object label 74 is a cosine measure and is given by the expression COS (v,w), where the vector v denotes the query 60 and the vector w denotes the content label 74. In one embodiment the N objects with the highest similarity are returned. In another embodiment all objects labels 74 which generate cosine values greater than a predetermined value are considered sufficiently similar to the query 60 to be returned to the user 10 as relevant information.

Once the similarity is determined, the home node 24 orders the OIDs according to their degree of similarity and then returns a list 72 of the most relevant OIDs 70 directly to the user computer 10 or any other computer specified (Step 6), by way of a wide area network 20 or local area network 20 without the intervention of the front end computer 14.

Alternatively, for higher levels of service (level 2 and level 3), the home node 24 passes the most relevant OIDs 70 back to the computer nodes 28, 32 (Step 7) which hold the information or content labels 74 identified by the OIDs 70. These computer nodes 28, 32 then pass the requested information or content labels 74 directly to the user 10 (Step 8).

Figure 3:
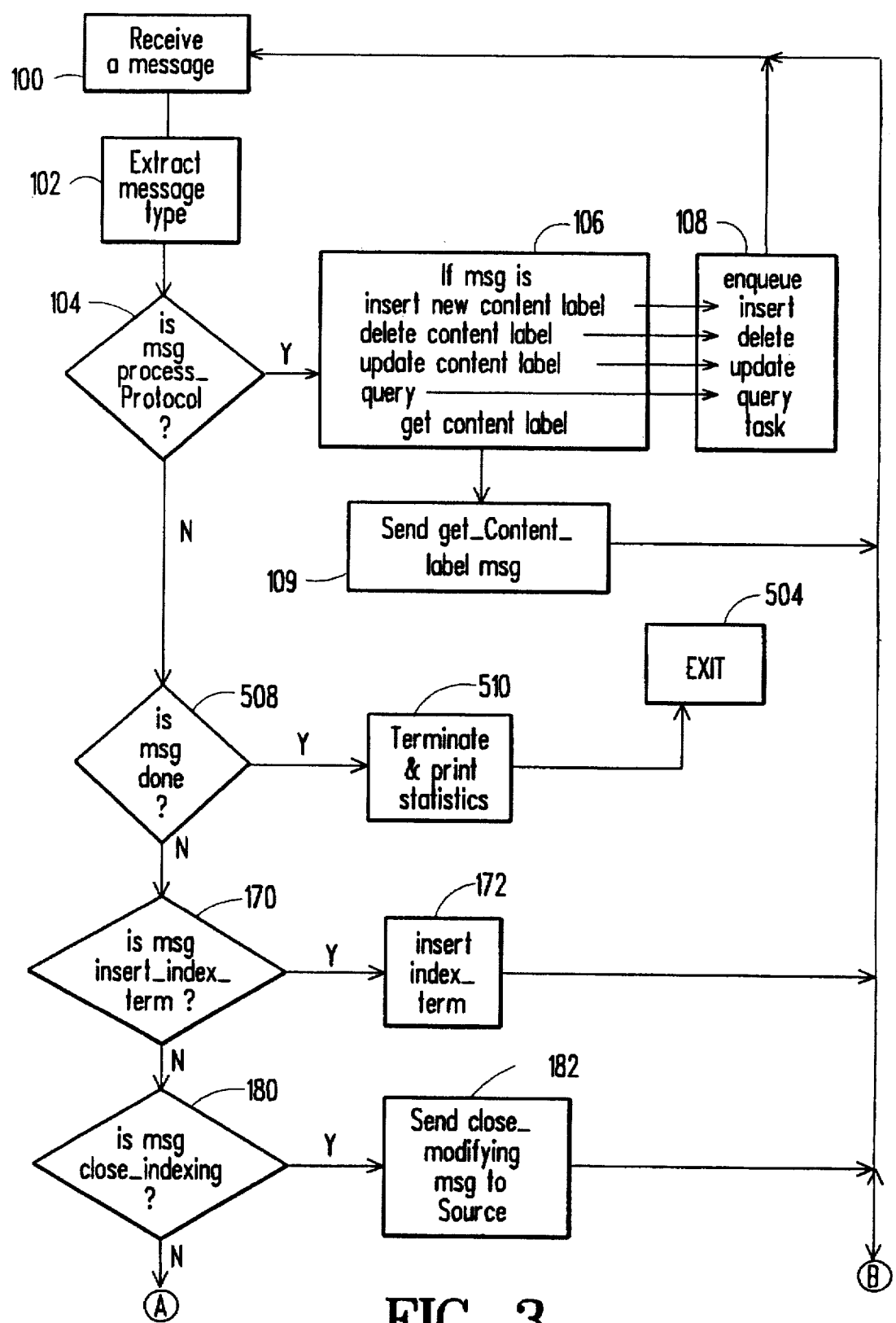
FIGS. 3, 3a and 3b are a functional diagram of an embodiment of a main message handling routine executed by the nodes of the embodiment of the distributed computer database system shown in FIG. 1.
Figure 3A:
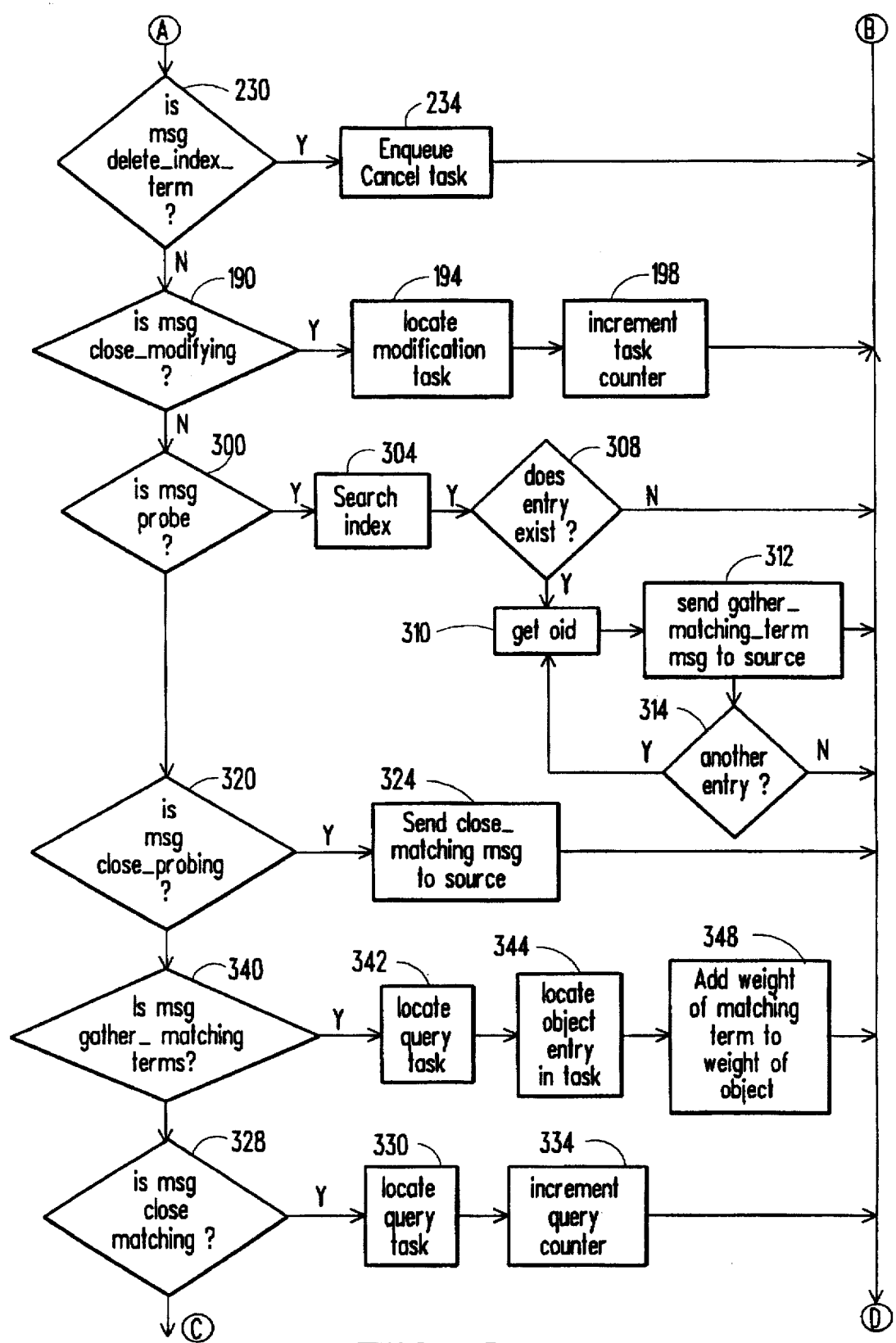
Figure 3B:
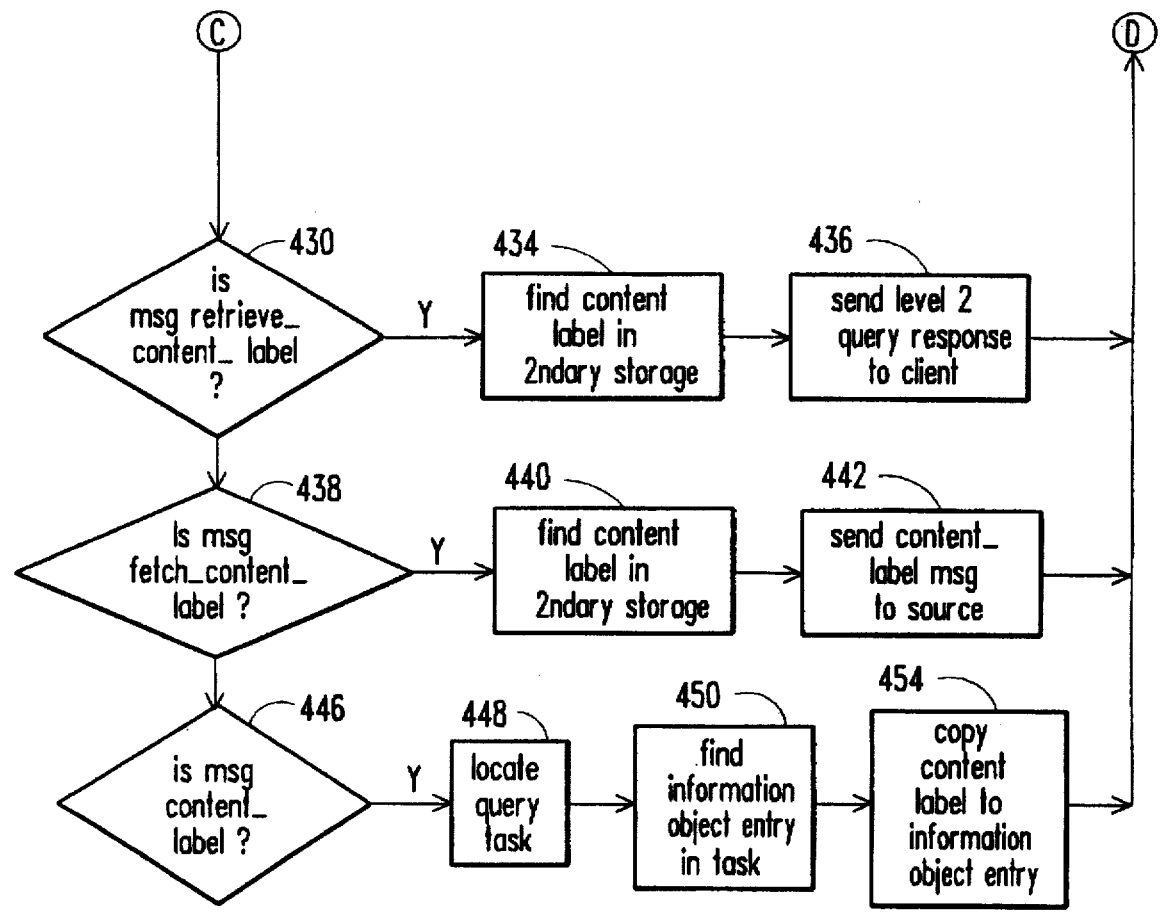

In more detail, the highest priority task being executed on all the nodes of the search engine 16 is the message handling task shown in FIGS. 3, 3a and 3b. Each node waits to receive a message (100) which may be exchanged between the front end node 14 and the home node 24; the home node 24 and the query nodes 26, 28, 30, 32; the home node 24 and the client 10; and the query nodes 26, 28, 30, 32, and the client 10. The message includes a TYPE field which identifies the type of message that is being sent, the source and destination addresses of the nodes, the data to be acted upon and weight information. Upon reception of a message the receiving node determines what type of message has been received by first extracting the message TYPE from the message packet (102).

If the message type received is a PROCESS—PROTOCOL message (104), the message has been sent by the front end node in response to a command from the user 10 and received by a node which is now designated the home node 24. The PROCESS—PROTOCOL message therefore contains a command from the user 10 which is transmitted to the home node 24 by the front end node 14. In one embodiment there are five valid commands (106): INSERT—NEW—CONTENT—LABEL, DELETE—CONTENT—LABEL, UPDATE—CONTENT—LABEL, QUERY and GET—CONTENT—LABEL. The home node 24 enqueues (108) an INSERT—TASK, a DELETE—TASK, an UPDATE—TASK or a QUERY—TASK, respectively, in response to the command INSERT—NEW—CONTENT—LABEL, DELETE—CONTENT—LABEL, UPDATE—CONTENT—LABEL, or QUERY contained in the message packet. Once the tasks are enqueued, they are executed as they reach the head of the queue.

In response to the GET—CONTENT—LABEL command, the home node 24 does not enqueue a task, but simply sends a RETRIEVE—CONTENT—LABEL message (109) to a query node, as is described in detail below.

Figure 4:
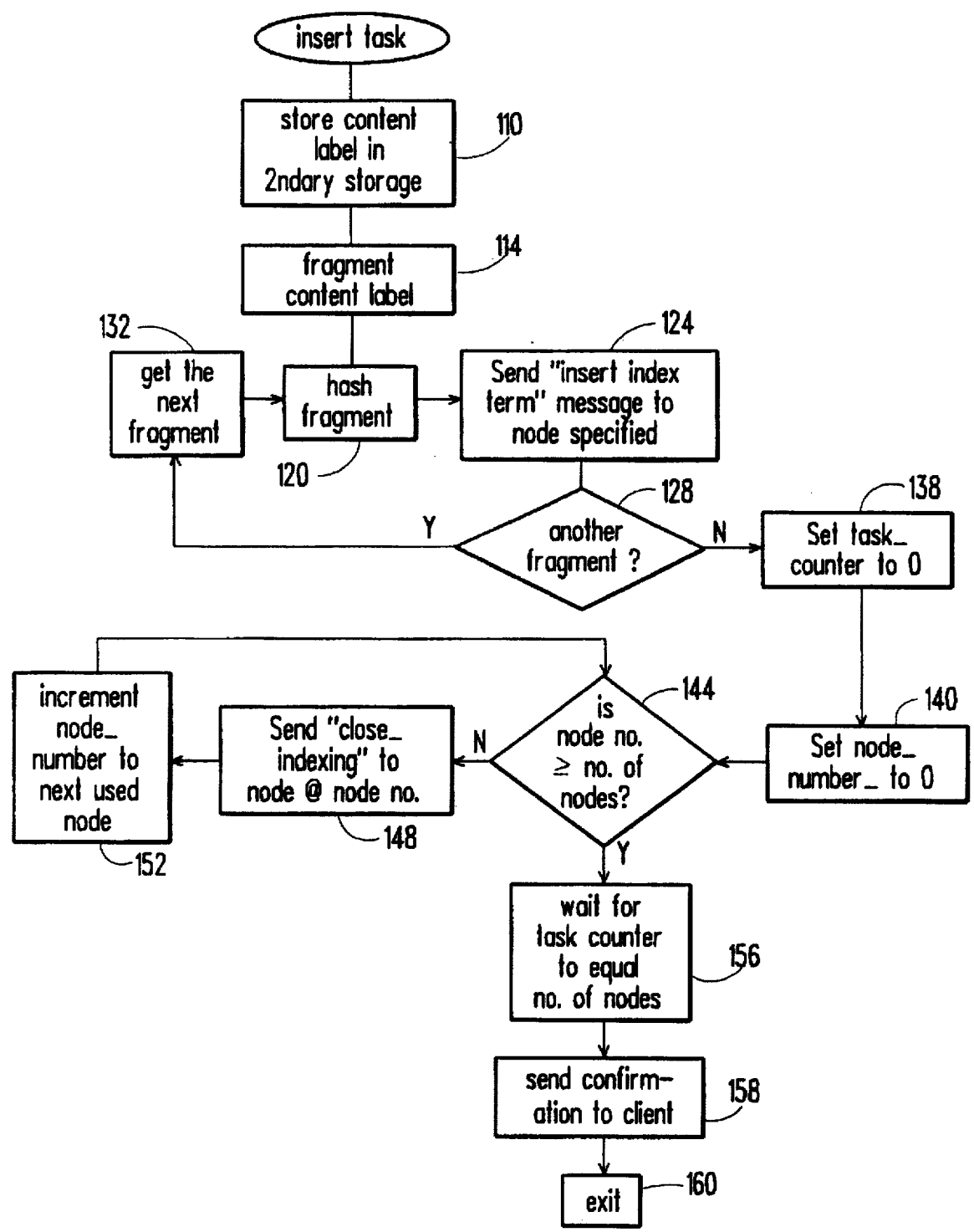
FIG. 4 is a functional diagram of an embodiment of an INSERT task executed on the home node of the embodiment of the distributed computer database system shown in FIG. 1 to insert an index term into a local database on a node of the system.

Referring also to FIG. 4, if the command is an INSERT—NEW—CONTENT—LABEL, the home node 24 executes an INSERT—TASK. The INSERT—TASK stores the new content label in secondary storage (110) and then fragments the content label (114). The fragments of the content label are then hashed (120) into a hash value having a node number portion and a hash index value. The home node 24 then sends an INSERT—INDEX—TERM message containing the hash index value to the query node 26 specified by the node number portion of the hashed fragment (124). The home node 24 then determines if there is another fragment (128) and if so, retrieves (132) and hashes the next fragment (120). Once all the hashed fragments have been sent to the query nodes 26, 28 the home node 24 sets a TASK—COUNTER variable (138) and NODE—NUMBER variable to zero (140). The NODE—NUMBER variable is compared to the number of nodes in the network (144) and if the variable is less than the number of nodes on the network, the home node 24 sends a CLOSE—INDEXING message to the node 26 designated by the NODE—NUMBER variable (148) and increments the NODE—NUMBER variable to the next query node 28 in a list of nodes on the network (152). In another embodiment the home node 24 only increments the NODE—NUMBER variable to the next query node 28 to which at least one INSERT—INDEX—TERM message was sent. The CLOSE—INDEXING message instructs the query nodes 26, 28 that all the hashed index terms have been distributed. If the NODE—NUMBER variable is greater than or equal to the number of nodes in the network, the home node 24 waits for TASK—COUNTER (whose function is described below) to equal the number of nodes in the network (156), and once this occurs, sends a confirmation to the user 10 (158) of the completion of the index insertion task and then exits (160). In another embodiment the home node 24 only waits for the TASK—COUNTER to equal the number of nodes to which at least one INSERT—INDEX—TERM message was sent.

When a query node 26, 28 receives an INSERT—INDEX—TERM message (170) FIG. 3, the query node 26, 28 inserts the hashed index term into its local index table (172) using any of the algorithms known to those skilled in the art and loops to receive the next message (100). When the query node 26, 28 receives a CLOSE—INDEXING message, indicating that all the new index terms have been distributed, the query node 26, 28 replies with a CLOSE—MODIFYING message to the source or home node 24 (182) and again loops for the next message (100).

When the source or home node 24 receives a CLOSE—MODIFYING message (190), the home node 24 locates the task which was enqueued and generated the CLOSE—INDEXING message to which the query node is responding (194) and increments the TASK—COUNTER associated with that task (198). As shown in FIG. 4, it is upon the incrementing of the TASK—COUNTER that the INSERT—TASK is waiting (156). Once the TASK—COUNTER is incremented (198) the home node 24 loops to receive another message (100).

Figure 5:
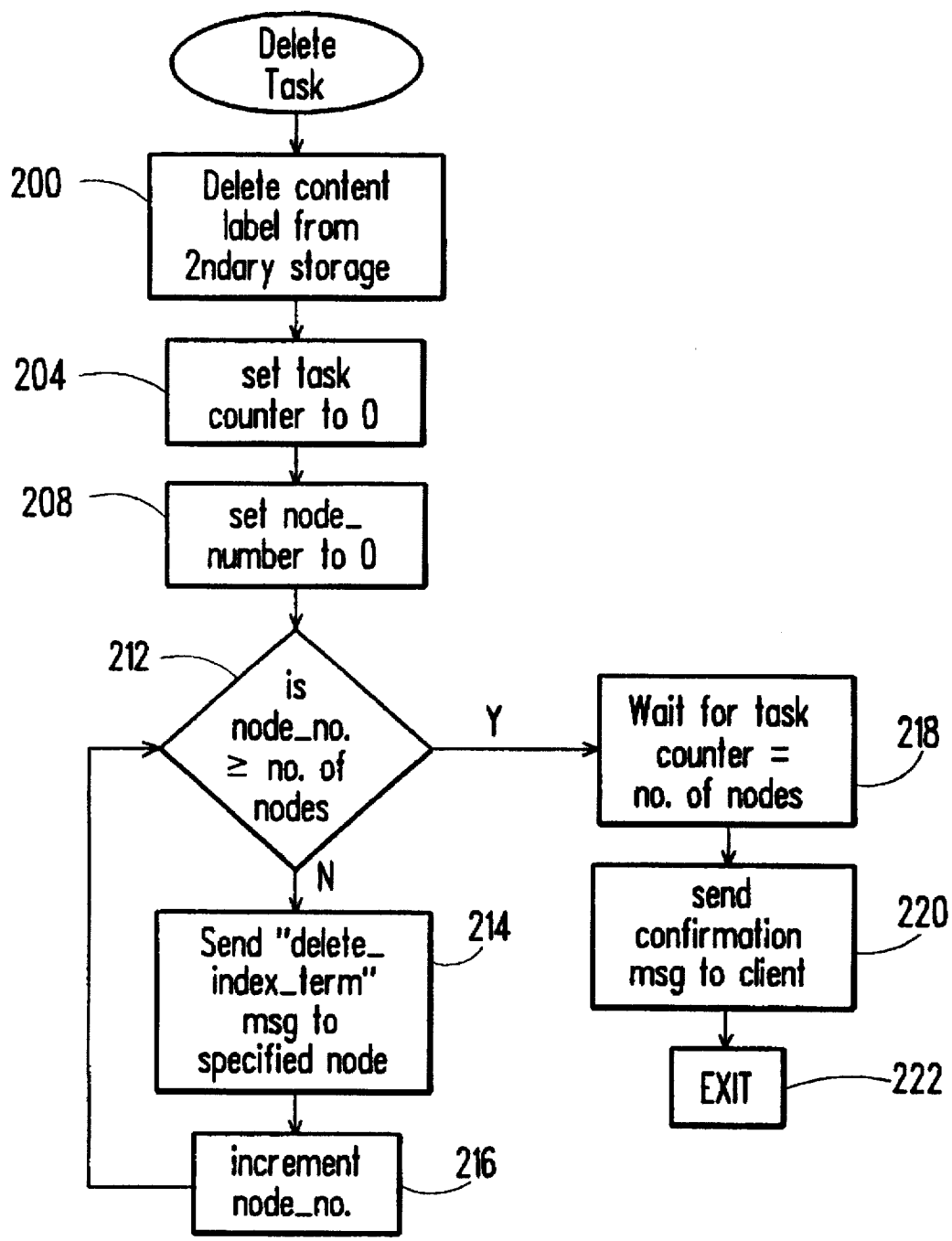
FIG. 5 is a functional diagram of an embodiment of a DELETE task executed on the home node of the embodiment of the distributed computer database system shown in FIG. 1 to delete an index term.

Referring again to FIG. 3, if the command is a DELETE—CONTENT—LABEL, the home node 24 enqueues and executes a DELETE TASK. The DELETE—TASK (FIG. 5) first deletes the content label from secondary storage (200). The variables TASK—COUNTER (204) and NODE—NUMBER (208) are then set to zero. The home node 24 then determines if the variable NODE—NUMBER is less than the number of nodes on the network (212) and if so, sends a DELETE—INDEX—TERM message to the node designated by the current NODE—NUMBER (214). The home node 24 then increments the variable NODE—NUMBER (216) and loops. If the variable NODE—NUMBER is greater than or equal to the number of nodes on the network, the home node 24 waits for the variable TASK—COUNTER to equal the number of nodes (218) and then sends a confirmation message to the client 10 that the DELETE—TASK has completed (220) prior to exiting (222).

Figure 6:
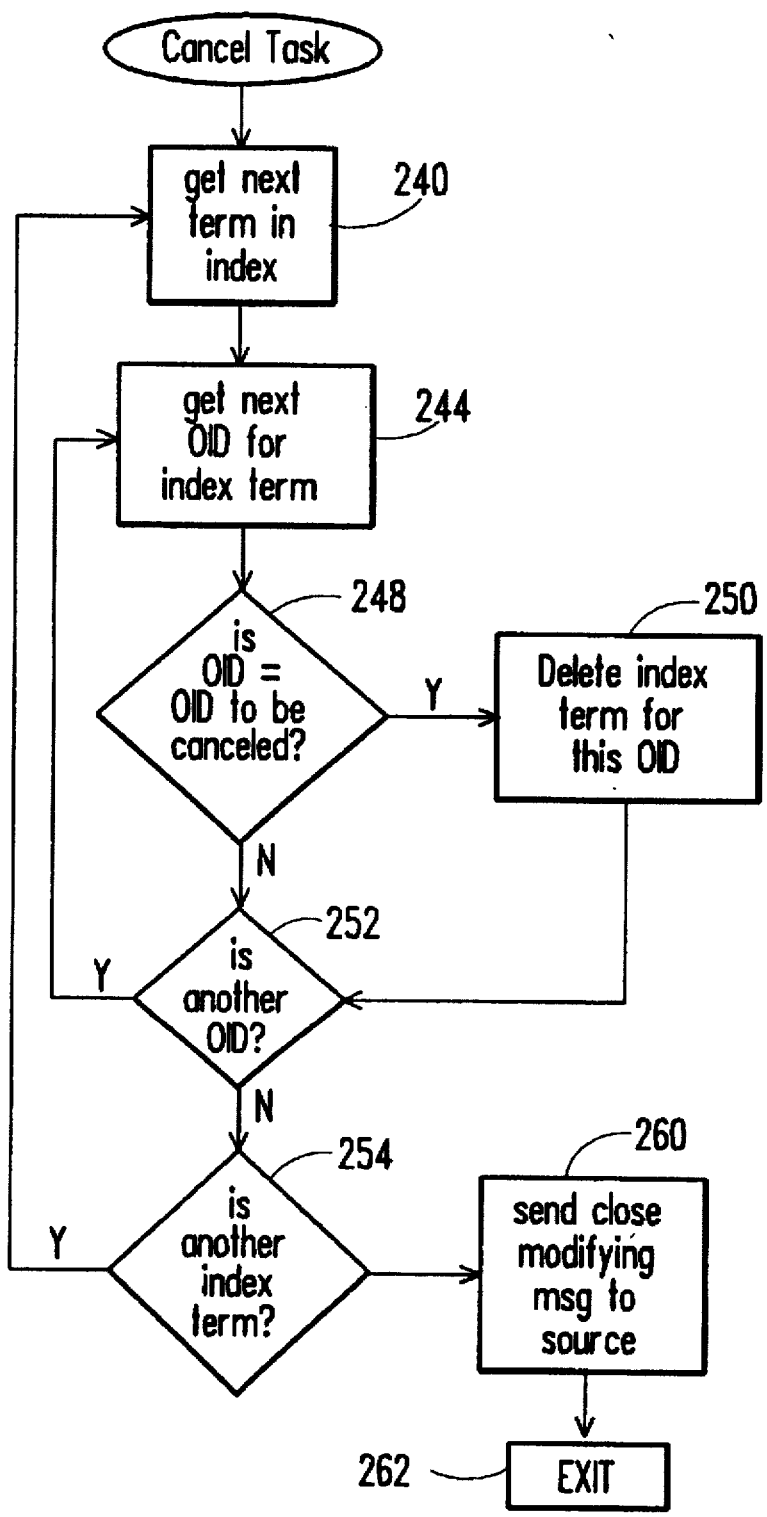
FIG. 6 is a functional diagram of an embodiment of a CANCEL task executed on a query node of the embodiment of the distributed computer database system shown in FIG. 1 in response to a command from the home node to delete an index term from a local database.

Referring to FIG. 3a, when the query node 26, 28 receives the DELETE—INDEX—TERM, it enqueues a CANCEL—TASK to remove all the entries in the local database corresponding to the index term to be deleted (234) and loops to receive another message (100). Referring to FIG. 6, the CANCEL—TASK begins by reading an index term in the local index (240) and finding the OID which corresponds to that term (244). The query node 26,28 performs a sequential search of all OIDs in the hash table. Sequential scanning of the hash table is used because, in this embodiment, the original content label being delete is not known, so it cannot be fragmented and hashed as it is for the INSERT task. In other embodiments, it is possible to use the original content label and is desirable to do so if content labels are frequently updated. A determination is then made as to whether the OID is equal to the OID being deleted (248). If the OID is to be cancelled, the index term for this OID is deleted (250). A determination is then made as to whether there is another OID equal to the OID being deleted (252). If there is another OID equal to the OID being deleted, the index term for this OID is cancelled (250). If there is not another OID corresponding to the OID being deleted, a determination is made as to whether there is another index term (254) and if so, the next term in the index is read (240). If there are no more terms in the local hash table, the query node 26, 28 sends a CLOSE—MODIFYING message (260) to the source of the command or the home node 24 and exits (262).

As described with respect to the INSERT—INDEX—TERM command, (FIG. 3a) when the source or home node 24 receives a CLOSE—MODIFYING message (190), the home node 24 locates the task which was enqueued and which generated the DELETE—INDEX—TERM message to which the query node 26, 28 is responding (194) and increments the TASK—COUNTER associated with that task (198). It is upon this incrementing that the DELETE—TASK is waiting (218) FIG. 5. Once the TASK—COUNTER is incremented (198) the home node 24 loops to receive another message (100).

Figure 7:
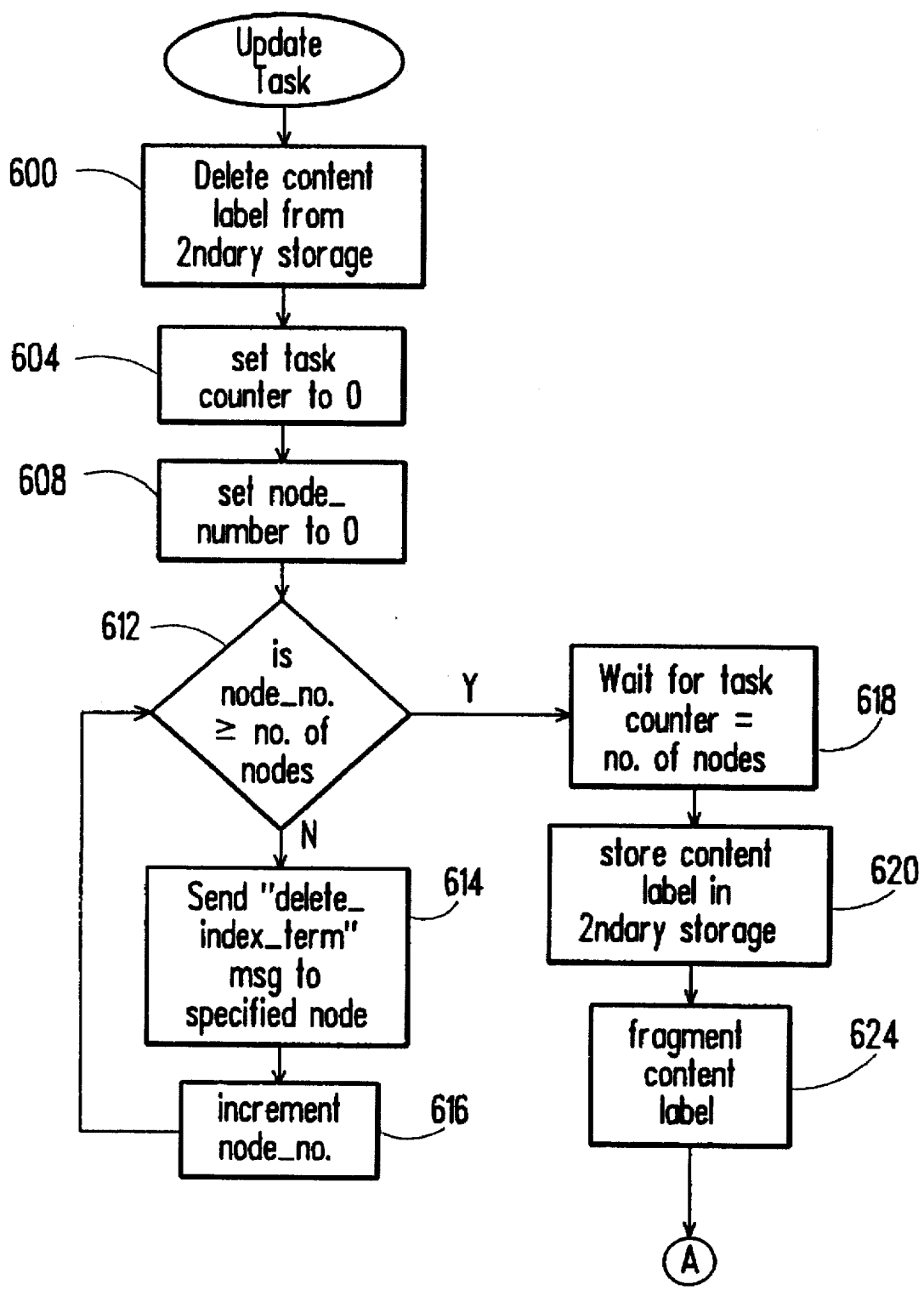
FIGS. 7 and 7a is a functional diagram of an embodiment of an UPDATE task executed on the home node of the embodiment of the distributed computer database system shown in FIG. 1 to update an index term.
Figure 7A:
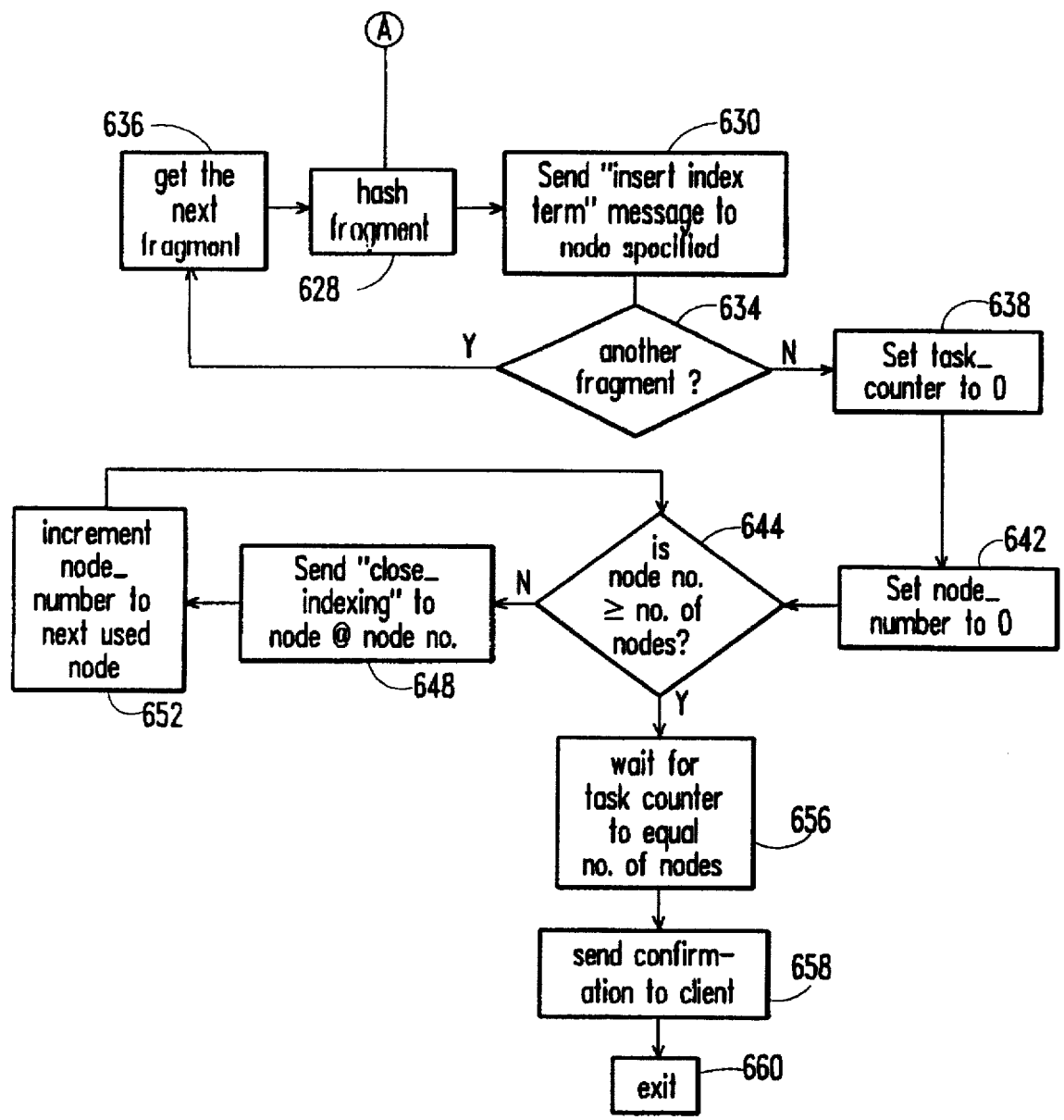

Referring again to FIG. 3, if the command is a UPDATE—CONTENT—LABEL (106), the home node 24 enqueues and executes an UPDATE—TASK (108). The UPDATE—TASK (FIGS. 7 and 7a) is a combination of an DELETE—TASK followed by an INSERT—TASK, without a confirmation being sent at the end of the DELETE—TASK. The UPDATE—TASK first deletes the content label from secondary storage (600) and then sets the variables TASK—COUNTER (604) and NODE—NUMBER (608) to zero. The home node 24 determines if the variable NODE—NUMBER is less than the number of nodes on the network (612) and if so, sends a DELETE—INDEX—TERM message to the node designated by the current NODE—NUMBER (614), increments the variable NODE—NUMBER (616) and loops. If the variable NODE—NUMBER is greater than or equal to the number of nodes on the network, the home node 24 waits for the variable TASK—COUNTER to equal the number of nodes (618). When TASK—COUNTER is equal to the number of nodes, the task stores the new content label in secondary storage (620) and then fragments the content label (624). As described previously, the fragments of the content label are then hashed (628) into a hash value having a node number portion and a hash index value. The home node 24 then sends an INSERT—INDEX—TERM message containing the hash index value to the query node 26 specified by the node number portion of the hashed fragment (630). The home node 24 then determines if there is another fragment (634) and if so, retrieves (636) and hashes the next fragment (628). Once all the hashed fragments have been sent to the query nodes 26, the home node 24 sets a TASK—COUNTER variable (638) and NODE—NUMBER variable to zero (642). The NODE—NUMBER variable is compared to the number of nodes in the network (644) and if the variable is less than the number of nodes on the network, the home node 24 sends a CLOSE—INDEXING message to the node 26 designated by the NODE—NUMBER variable (648) and increments the NODE—NUMBER variable to the next query node 28 in a list of nodes on the network (652). As discussed with respect to the INSERT—TASK, in another embodiment the home node 24 only increments the NODE—NUMBER variable to the next query node 28 to which the INSERT—INDEX—TERM message was sent. If the NODE—NUMBER variable is greater than or equal to the number of nodes in the network, the home node 24 waits for TASK—COUNTER to equal the number of nodes in the network (656), and once this occurs, sends a confirmation to the user 10 (658) of the completion of the UPDATE—TASK and then exits (660). The response by the query node to the messages sent by the UPDATE—TASK have been described above with respect to the INSERT—TASK and the DELETE—TASK.

Figure 8:
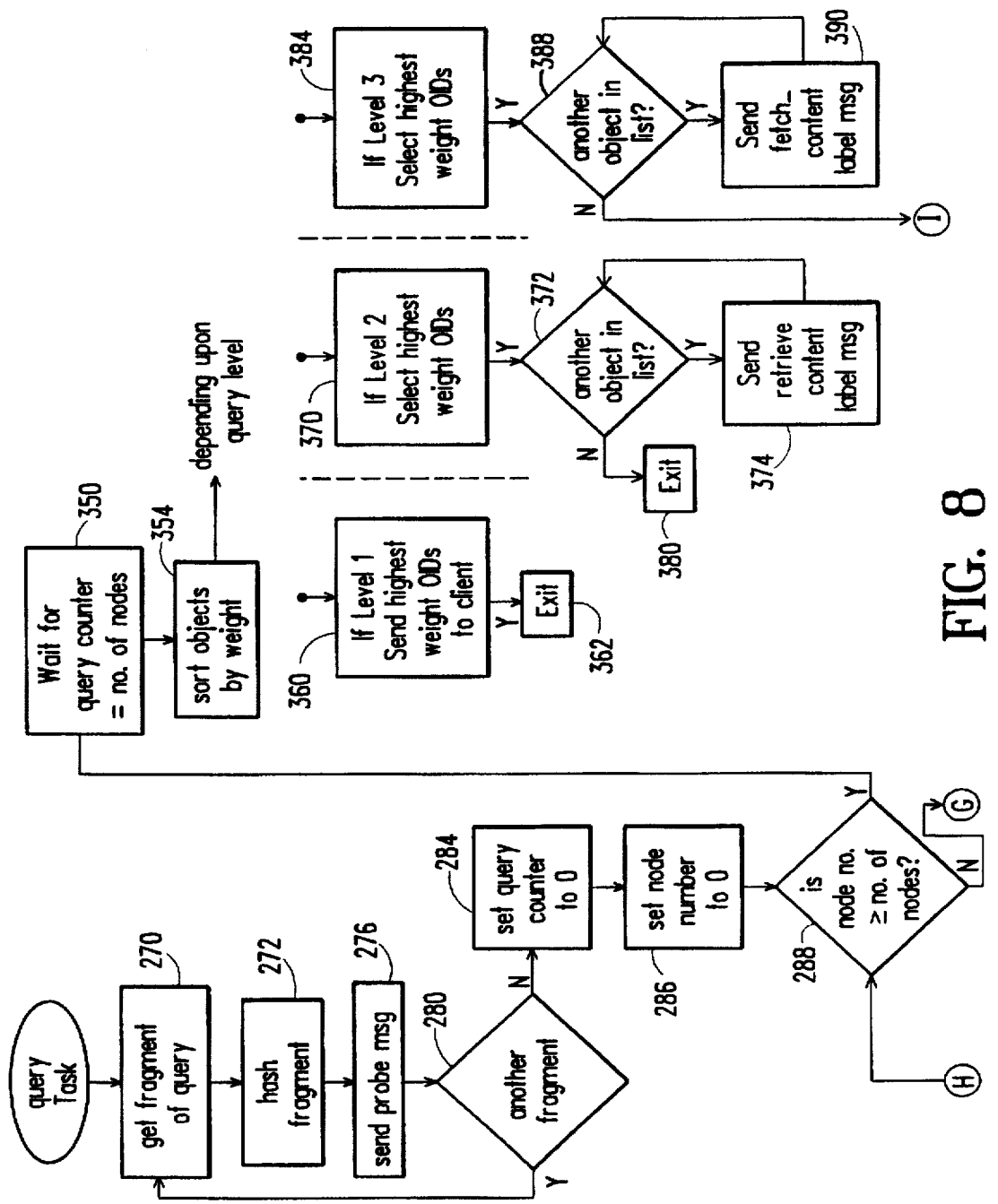
FIGS. 8 and 8a are a functional diagram of an embodiment of a QUERY task executed on the home node of the embodiment of the distributed computer database system shown in FIG. 1 to search for a content label.
Figure 8A:
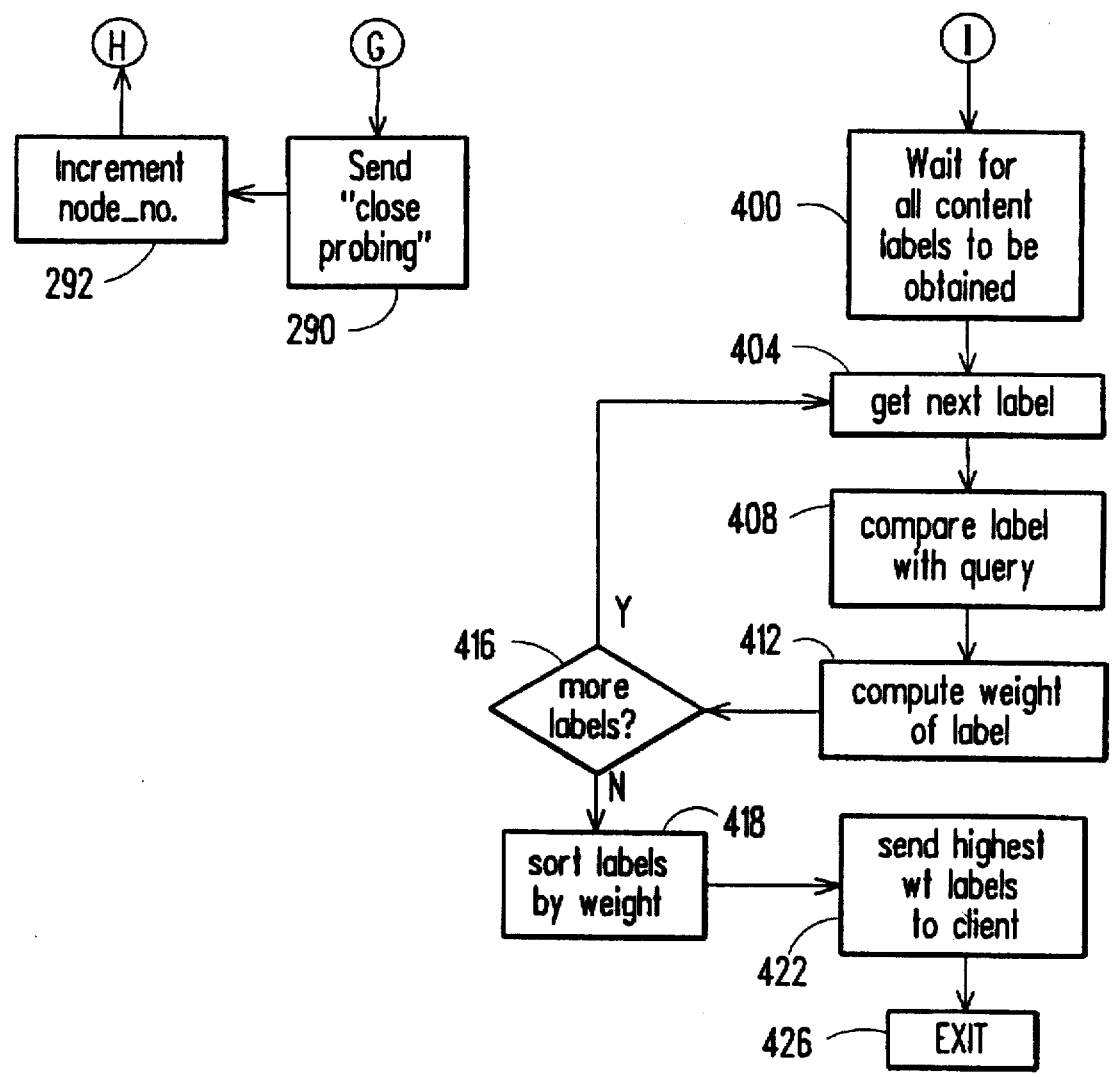

Referring to FIG. 3, if the command is a QUERY (106), the home node 24 enqueues and executes a QUERY—TASK (108) as described above. Referring also to FIGS. 8 and 8a, the home node 24 fragments the query 60 (270) and hashes the fragment (272) using the same hashing function that was used by the INSERT—TASK as disclosed above. The home node 24 then sends a PROBE message (276) to the node 26 whose address is indicated by the first portion of the hashed fragment. The PROBE message to the query node 26 includes the second portion of the hashed query fragment. The home node 24 then determines whether there is another fragment of the query to process (280). If the is another fragment, that fragment is obtained (270), hashed (272) and transmitted to the node indicated by the first portion of the hashed fragment (276).

If there are no further fragments to process, the home node 24 sets the TASK—COUNTER variable (284) and the NODE—NUMBER variable (286) to zero, and a determination is made whether the NODE—NUMBER is less than the number of nodes in the network (288). If NODE—NUMBER is less than the number of nodes, a CLOSE—PROBING message is sent (290) to the query node indicated by the NODE—NUMBER variable (to inform the query node that all the query fragments have been sent to the query nodes) and the NODE—NUMBER variable is incremented (292).

Referring again to FIG. 3a, when a query node 26 receives a PROBE message, the query node 26 searches its local index for a match to the second portion of the hashed fragment contained in the PROBE message (304). If no matching index term exists (308), the query node 26 simply awaits the next message (100). If a match exists, the OID having the hash value is accessed (310) and the query node 26 sends a GATHER—MATCHING—TERMS message back to the home node 24 (312). The query node 26 then determines if there is another entry in the index matching the hash value in the PROBE message (314). If another entry in the database is matched by the index term, the query node 26 again gets the OID (310) and sends a GATHER—MATCHING—TERMS message back to the home node (310). If no entries are matched by the index term, the query node 26 loops to receive the next message (100).

Similarly, when a query node 26 receives a CLOSE—PROBING message from the home node 24 (320), the query node 26 sends a CLOSE—MATCHING message to the source or home node 24 (324). When the home node 24 receives a CLOSE—MATCHING message from the query node 26 (328), it locates the QUERY task (330) to which the query node 26 is responding and increments the variable QUERY—COUNTER (334) and loops to receive another message (100).

When the home node 24 receives a GATHER—MATCHING—TERMS message from the query node 26 (340), the home node 24 locates (342) the QUERY task which generated the probe 62 which caused the GATHER—MATCHING—TERMS message to be sent and locates the object entry in the task (344). The home node 24 then adds the weight of the matching term to the total weight of the object (348) and returns to await another message (100).

In one embodiment, the weight of the matching term is computed using a COS function. The query and the index term are treated as vectors with the weight of the matching term determined by the COS function $COS(v,w)$, where $v$ is the query vector and $w$ is the index term vector.

Similarly, the total weight of the object is determined from the COS function according to the following formula:

$$COS(v,w) = \frac{\sum_t v_t w_t}{\|v\| \|w\|}$$

The sum is over all terms (i.e. both index and query terms) and the product $v_t w_t$ is non-zero only if the term occurs both in the query and in the content label. The length of the vectors $v$ and $w$ are computed by the formulae:

$$\|v\| = \sqrt{\sum_t (v_t)^2}$$

$$\|w\| = \sqrt{\sum_t (w_t)^2}$$

If $v$ represents the query, then $\|v\|$ is never actually computed since weights are only considered relative to one another for the same query. The value of $\|w\|$ is precomputered and what is actually stored are the normalized content label vectors $w/\|w\|$.

Referring again to FIG. 8, when the QUERY—COUNTER is equal to the number of nodes (350) all the requested data has been received and the object labels are sorted by weight to determine the closeness of the matching of the query 60 and the content labels 74 retrieved (354). The remaining instructions executed by the QUERY task, depend upon the query level. If the query level is one, only the OIDs with the highest weights are returned to the client 10 (360) and the QUERY task exits (362).

If the query level is two, the OIDs with the highest weights are selected and a determination is made as to which objects correspond to those highest weight OIDs (370). The highest weight content labels are selected (372) and the list of highest weight content labels 72 are sent by way of a RETRIEVE—CONTENT—LABEL message to the query node 26 (374) having a node number equal to the information object identifier modulo the number of nodes. That is, the OID modulo the number of nodes can be regarded as another hash function that maps the OID to the node containing the content label. The set of nodes that store content labels in secondary storage need not be the same set as the one that stores the hash table in main memory. The hash function for fragments maps a fragment to the set of matching OIDs. The hash function for OIDs maps an OID to the node containing the corresponding content label. The content label contains information on how to acquire the information objects themselves. If no further objects exist, the QUERY task exits (380).

Referring also to FIG. 3b, when a query node 26 receives a RETRIEVE—CONTENT—LABEL (430), it locates the content label in secondary storage (434) and sends the level 2 query response to the client 10 (436). The query node 26 then loops for another message (100).

Referring again to FIG. 8a, as with level two, if the query level is three, the highest weight OIDs are selected, a determination is made as to which objects correspond to those highest weight OIDs (384) and those objects are selected (388). A FETCH—CONTENT—LABEL message is sent to the query node 26 (390) again corresponding to the information object identifier modulo the number of nodes.

Referring again to FIG. 3b, when the query node 26, receives a FETCH—CONTENT—LABEL message 438, the query node 26 finds the content label in secondary storage 440 and sends a CONTENT—LABEL message to the source of the FETCH—CONTENT—LABEL (442). When the home node 24, receives the CONTENT—LABEL message (446), it locates the QUERY task which generated the FETCH—CONTENT—LABEL message (448), finds the information object entry within the QUERY task (450) and copies the content label to the information object entry (454). The home node 24 then loops to receive another message (100).

Referring again to FIG. 8a, if no further objects exist in the list, the QUERY task waits for all the content labels to be obtained (400). Once all have been obtained, the QUERY task obtains a content label (404) and compares the content label with the query 60 (408). The QUERY task then computes the weight of the label (412). Unlike the weight computed in level 1 and 2 processing, which use fragments of a limited size, the weight computed in level 3 processing considers fragments of any size. In addition, the fragments of the content label that match fragments of the query are marked in the content label. Therefore, if the content label is shown to the user who requested the query, the marked fragments can be distinguished, for example by highlighting, to show the user the reason why the content label was chosen in response to the user's query. Highlighting also serves to focus the user's attention on those portions of the content label that are most likely to be relevant and aid in helping the user formulate subsequent queries. A determination is then made as to whether there are more content labels to process (416) and if so, the next content label is fetched (404). If there are no further content labels, the labels are sorted by weight (418) and the content labels with the highest weights are sent to the client 10 (422). The QUERY task then exits (426).

Referring to FIG. 3, the command DONE is issued to terminate network activity, for example, to permit the software or ontology to be modified. If the message received from the front end node 14 is DONE 508, the activity on the network is terminated and is accompanied by the gathering and printing of activity statistics by the home node 24 (510). When the statistics are printed, the task exits (504).

Figure 9:
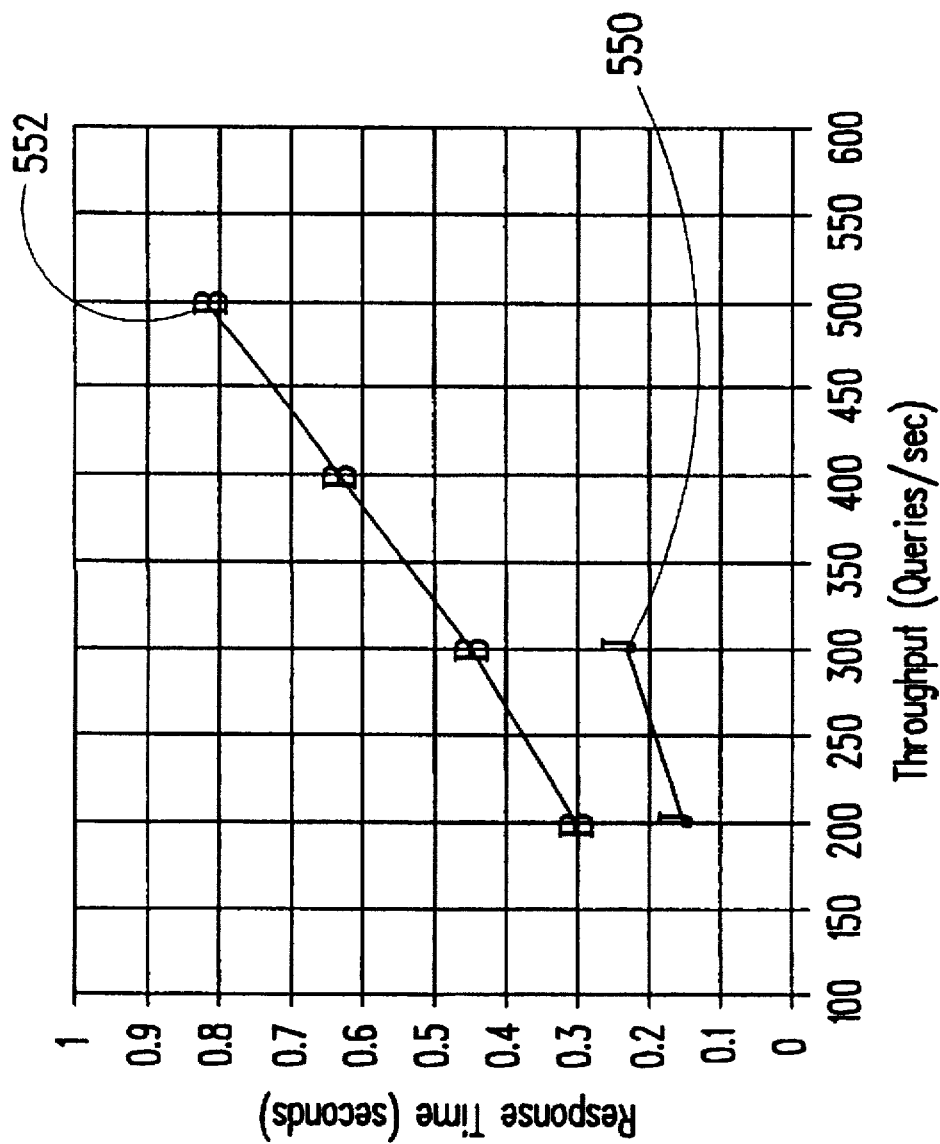
FIG. 9 is a graph of the 95$^{th}$ percentile response time to a query plotted against the throughput for the embodiment of the distributed computer database system shown in FIG. 1.

A graph showing the 95th percentile response time versus throughput (number of queries processed per second) for a four node 550 and an eight node 552 embodiment of system of FIG. 1 is shown in FIG. 9. In this example the database consists of 80,000 information objects indexed by four nodes and 160,000 information objects indexed by eight nodes. The content labels have, on average, 200 index terms, and the queries have, on average, 10 fragments. Each probe produces, on average, four GATHER—MATCHING—TERMS messages at the query node.

It should be noted that tests on a 16-node system have resulted in the same response time graph as that for an 8-node system. Careful monitoring of the system has shown that statistical fluctuations dissipate quickly and the system is very stable as long as the bandwidth of the network is not approached too closely. The network vendor, for the network used in the embodiment disclosed, recommends that the network not be used for transmitting more than 40% of the rated maximum bandwidth. Thus for the embodiment disclosed, this limit is about 500 Kbytes/sec (4 Mbits/second). It should be noted, the actual response time for any system is very sensitive to the properties of the database and the distribution of queries. Thus, the throughput achieved by any given system may vary.

Having shown the preferred embodiment, those skilled in the art will realize many variations are possible which will still be within the scope and spirit of the claimed invention. Therefore, it is the intention no limit the invention only as indicated by the scope of the claims.

What is claimed is:

1. A method for information retrieval using fuzzy queries in a non-relational, distributed database system having a plurality of home nodes and a plurality of query nodes connected by a network, said method comprising the steps of:

randomly selecting a first one of said plurality of home nodes;

fragmenting, by said selected home node, a query from a user into a plurality of query fragments;

hashing, by said selected home node, each said query fragment of said plurality of query fragments, said hashed query fragment having a first portion and a second portion;

transmitting, by said selected home node, each said hashed query fragment of said plurality of query fragments to a respective one of said plurality of query nodes indicated by said first portion of each said hashed query fragment;

using, by said query node, said second portion of said respective hashed query fragment to access data according to a local hash table located on said query node; and returning, by each said query node accessing data according to said respective hashed query fragment, an object identifier corresponding to said accessed data to said selected home node.

2. The method of claim 1 further comprising the step of receiving, at said home node, said query from said user, prior to the step of fragmenting said query.

3. The method of claim 1 further comprising the steps of:
determining, by said home node, a measure of relevance between said accessed data and said query; and
returning, to said user, by said home node, accessed data having a predetermined degree of relevance,
subsequent to the step of returning said object identifier.

4. The method of claim 3 wherein said measure of relevance is determined by a cosine measure.

5. The method of claim 1 wherein said first portion of said hashed query fragment comprises 5 bits and said second portion comprises 32 bits.

6. A method of storing objects in a manner which is conducive to information retrieval using fuzzy queries in a non-relational, distributed database system having a plurality of home nodes and a plurality of query nodes connected by a network, said method comprising the steps of:

randomly selecting a first one of said plurality of home nodes;

fragmenting, by said selected home node, objects from a user into a plurality of object fragments;

hashing, by said selected home node, each said object fragment of said plurality of object fragments, said hashed object fragment having a first portion and a second portion;

transmitting, by said selected home node, each said hashed object fragment of said plurality of data fragments to a respective one of said plurality of query nodes indicated by said first portion of each said hashed object fragment; and using, by said query node, said second portion of said respective hashed object fragment to store data according to a local hash table located on said query node.

7. The method of claim 6 further comprising the step of receiving, at said home node, said objects from said user, prior to the step of fragmenting said object.

8. A non-relational, distributed database system having an information retrieval tool for handling queries from a user, comprising:

a plurality of home nodes; and a plurality of query nodes;

said plurality of home nodes and said plurality of query nodes connected by a network, wherein each said home node, upon receiving a query from a user, fragments said query into a plurality of query fragments, hashes each said query fragment of said plurality of query fragments into a hashed query fragment having a first portion and a second portion, and transmits each said hashed query fragment to a respective one of said plurality of query nodes indicated by said first portion of said hashed query fragment, and further wherein each said query node uses said second portion of said hashed query fragment to access data according to a local hash table located on said query node and returns an object identifier corresponding to said accessed data to said home node.

9. The distributed database system of claim 8 wherein said home node determines a measure of relevance between said accessed data and said query and returns to said user accessed data having a predetermined degree of relevance.

10. The method of claim 9 wherein said home node measures relevance using a cosine measure.

11. The method of claim 8 wherein said first portion of said hashed query fragment comprises 5 bits and said second portion comprises 32 bits.

12. A non-relational, distributed database system for storage and retrieval of information objects, comprising:

a plurality of home nodes; and a plurality of query nodes;

said plurality of home nodes and said plurality of query nodes connected by a network, wherein each said home node, upon receiving an object from a user, fragments said object into a plurality of object fragments, hashes each said object fragment of said plurality of object fragments into a hashed object fragment having a first portion and a second portion, and transmits each said hashed object fragment to a respective one of said plurality of query nodes indicated by said first portion of said hashed object fragment, and wherein each said query node uses said second portion of said hashed object fragment to store objects according to a local hash table located on said query node.

13. A non-relational, distributed database system having an information retrieval tool for handling queries from a user, comprising:

a plurality of home nodes; and a plurality of query nodes, said plurality of home nodes and said plurality of query nodes connected by a network, each said home node, upon receiving a command from a user, enqueueing a predetermined task in response to said command, a query task enqueued being resultant in, in response to a query command from said user, fragmenting a query contained in said query command into a plurality of query fragments, hashing each said query fragment of said plurality of query fragments into a hashed query fragment having a first portion and a second portion, and transmitting a query message containing each said hashed query fragment to a respective one of said plurality of query nodes indicated by said first portion of said hashed query fragment, said query node, upon receipt of said query message, using said second portion of said hashed query fragment to access data according to a local hash table located on said query node and transmitting a message returning an object identifier corresponding to said accessed data to said home node.

14. The method of claim 13 wherein said query message requests predetermined data from said query node in response to a query level contained in said query command from said user.

15. The method of claim 14 wherein there are three query levels.

16. The method of claim 14 wherein said query node returns a content label in response to a predetermined query level.

17. A non-relational, distributed database system for storage and retrieval of information, comprising:

a plurality of home node nodes; and a plurality of query nodes, said plurality of home nodes and said plurality of query nodes connected by a network, each said home node, upon receiving a command from a user, enqueueing a predetermined task in response to said command, an insert task enqueued, in response to an insert command from said user, fragmenting data contained in said insert command into a plurality of data fragments, hashing each said data fragment of said plurality of data fragments into a hashed data fragment having a first portion and a second portion, and transmitting an insert message containing each said hashed data fragment to a respective one of said plurality of query nodes indicated by said first portion of said hashed data fragment, said query node, upon receipt of said insert message, using said second portion of said hashed data fragment to store data according to a local hash table located on said query node.

\* \* \* \* \*

UNITED STATES PATENT AND TRADEMARK OFFICE
CERTIFICATE OF CORRECTION

| | | |
|---|---|---|
| PATENT NO. | : 5,694,593 | Page 1 of 1 |
| APPLICATION NO. | : 08/318252 | |
| DATED | : December 2, 1997 | |
| INVENTOR(S) | : Kenneth P. Baclawski | |

It is certified that error appears in the above-identified patent and that said Letters Patent is hereby corrected as shown below:

In the specification, column 1, line 4, please insert the following paragraph.

GOVERNMENT RIGHTS

This invention was made with government support under Grant No. NSF-9117030 awarded by the National Science Foundation in August 1992. The government has certain rights in the invention.

Column 11, line 48, after "10. The", delete "method" and insert --distributed database system--.

Column 11, line 50, after "11. The", delete "method" and insert --distributed database system--.

Column 12, line 32, after "14. The", delete "method" and insert --distributed database system--.

Column 12, line 36, after "15. The", delete "method" and insert --distributed database system--.

Column 12, line 38, after "16. The", delete "method" and insert --distributed database system--.

Signed and Sealed this

Fourteenth Day of October, 2008

JON W. DUDAS
*Director of the United States Patent and Trademark Office*